(12) United States Patent
Kadotani

(10) Patent No.: US 7,567,334 B2
(45) Date of Patent: Jul. 28, 2009

(54) LIQUID-CRYSTAL DISPLAY DEVICE COMPRISING A DEPRESSION FORMED ON INNER SURFACE OF A SUBSTRATE FOR RECEIVING EXCESS LIQUID CRYSTAL

(75) Inventor: Tsutomu Kadotani, Tokyo (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 0 days.

(21) Appl. No.: 10/629,650

(22) Filed: Jul. 30, 2003

(65) Prior Publication Data

US 2004/0021819 A1     Feb. 5, 2004

(30) Foreign Application Priority Data

Jul. 31, 2002   (JP)   ............... 2002-223114

(51) Int. Cl.
*G02F 1/1335* (2006.01)
(52) U.S. Cl. ...................... 349/158; 349/155
(58) Field of Classification Search ............... 349/155, 349/156, 158, 189, 190, 153, 138, 192, 43
See application file for complete search history.

(56) References Cited

U.S. PATENT DOCUMENTS

| | | | | |
|---|---|---|---|---|
| 4,705,360 | A * | 11/1987 | Funada et al. | 349/123 |
| 5,537,235 | A * | 7/1996 | Ishihara et al. | 349/155 |
| 5,917,572 | A * | 6/1999 | Kurauchi et al. | 349/156 |
| 5,946,070 | A * | 8/1999 | Kohama et al. | 349/156 |
| 5,978,065 | A * | 11/1999 | Kawasumi et al. | 349/188 |
| 6,018,380 | A * | 1/2000 | Hu et al. | 349/153 |
| 6,433,841 | B1 * | 8/2002 | Murade et al. | 349/43 |
| 6,873,391 | B2 * | 3/2005 | Jun et al. | 349/158 |
| 6,943,863 | B2 * | 9/2005 | Fujioka et al. | 349/153 |
| 2002/0075442 | A1 * | 6/2002 | Yanagawa et al. | 349/155 |

FOREIGN PATENT DOCUMENTS

| | | |
|---|---|---|
| CN | 1274092 A | 11/2000 |
| JP | 58-129419 A | 8/1983 |
| JP | 60-126625 A | 7/1985 |
| JP | 62-166317 A | 7/1987 |
| JP | 63-220115 A | 9/1988 |
| JP | 09-073093 A | 3/1997 |
| JP | 11-508708 A | 7/1999 |
| JP | 2000-314893 | * 11/2000 |
| JP | 2000-314893 A | 11/2000 |
| JP | 2002-182221 A | 6/2002 |
| KR | 2001-0098413 B1 | 11/2001 |

* cited by examiner

*Primary Examiner*—Thoi V Duong
(74) *Attorney, Agent, or Firm*—Sughrue Mion, PLLC

(57) ABSTRACT

A LCD device prevents image quality degradation caused by the gap non-uniformity in the display region with a simple measure. A TFT substrate and an opposite substrate are coupled to each other with a sealing member in such a way as to form a gap therebetween. A liquid-crystal layer is formed in the gap. Spacers are arranged in the liquid-crystal layer. The TFT substrate has a display region defined to include the pixels and a non-display region formed outside the display region. The non-display region is located between the display region and the sealing member. The spacers are located in a first part of the liquid-crystal layer corresponding to the display region while no spacer being located in a second part of the liquid-crystal layer corresponding to the non-display region. A depression for receiving extra liquid crystal may be additionally formed in the gap.

11 Claims, 13 Drawing Sheets

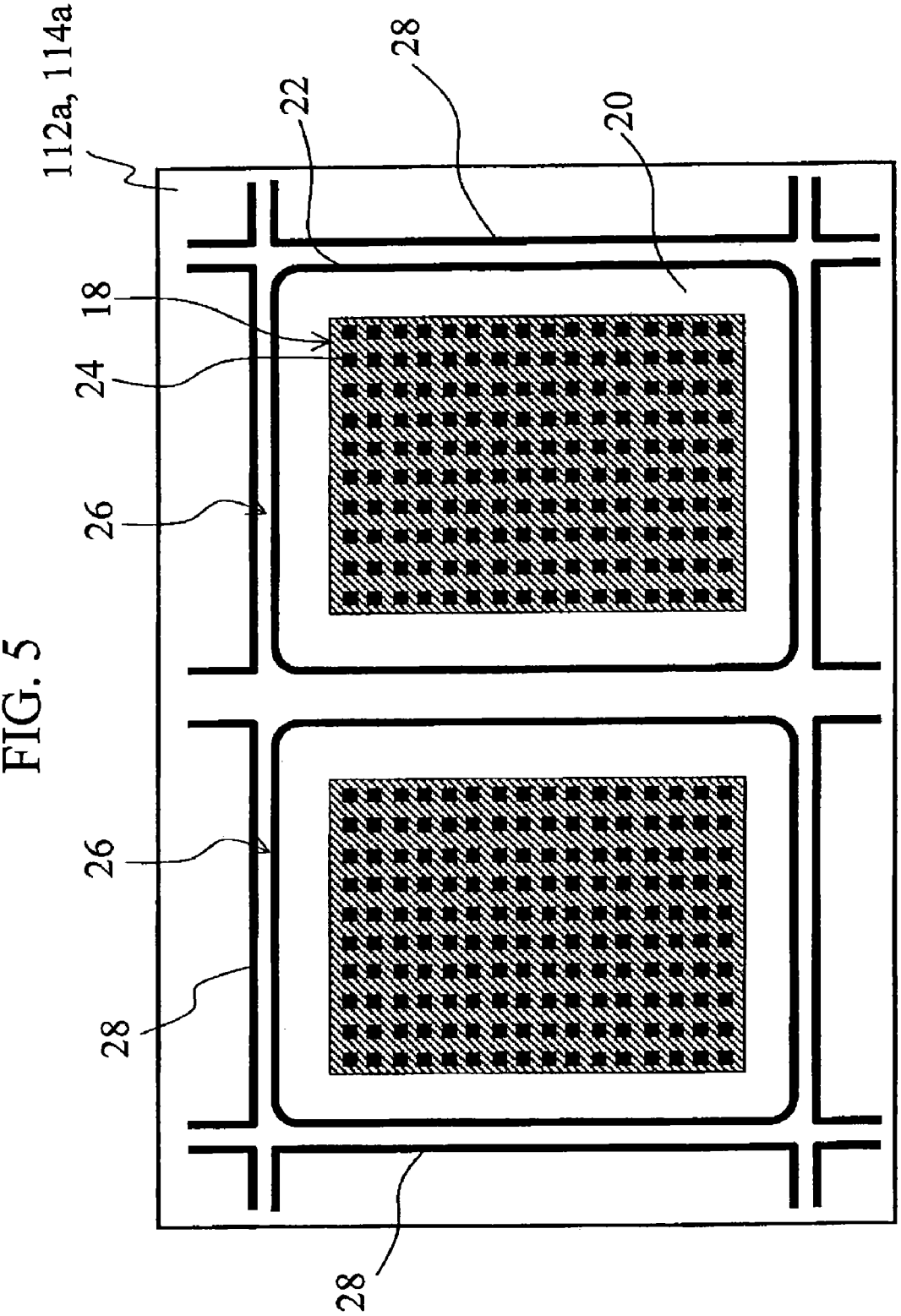

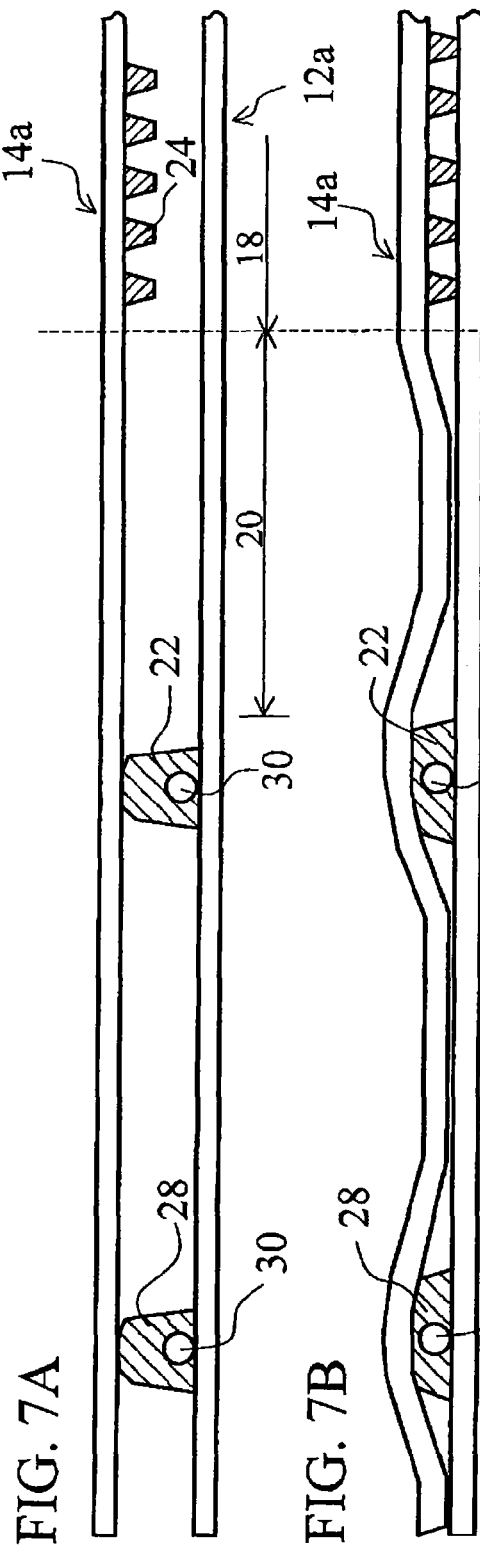
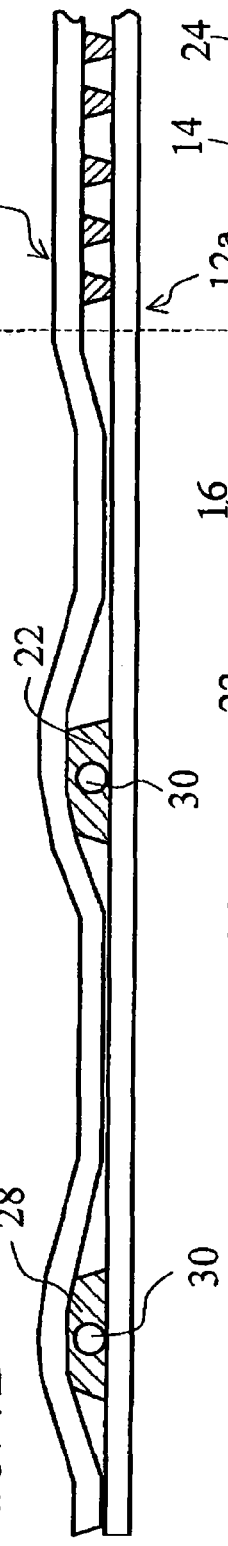
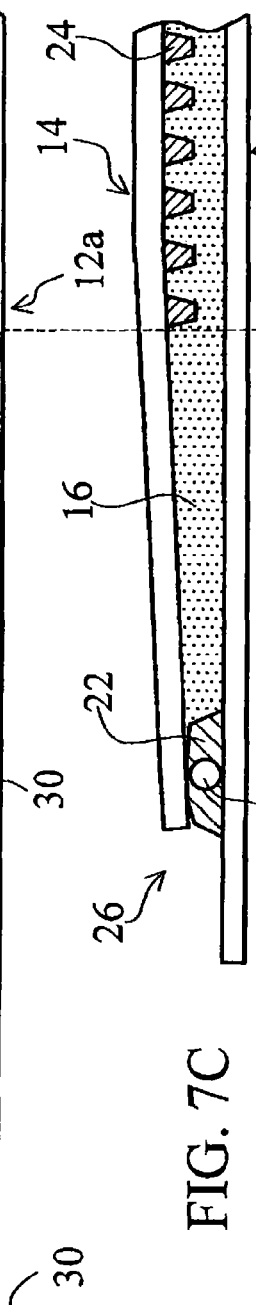
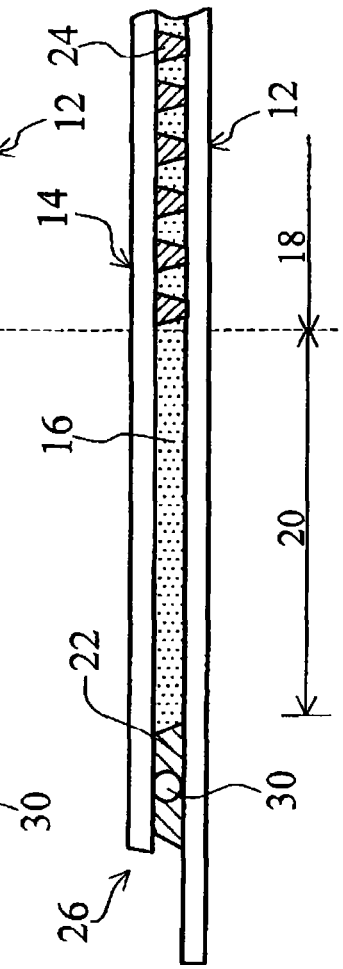
FIG. 7A
FIG. 7B
FIG. 7C
FIG. 7D

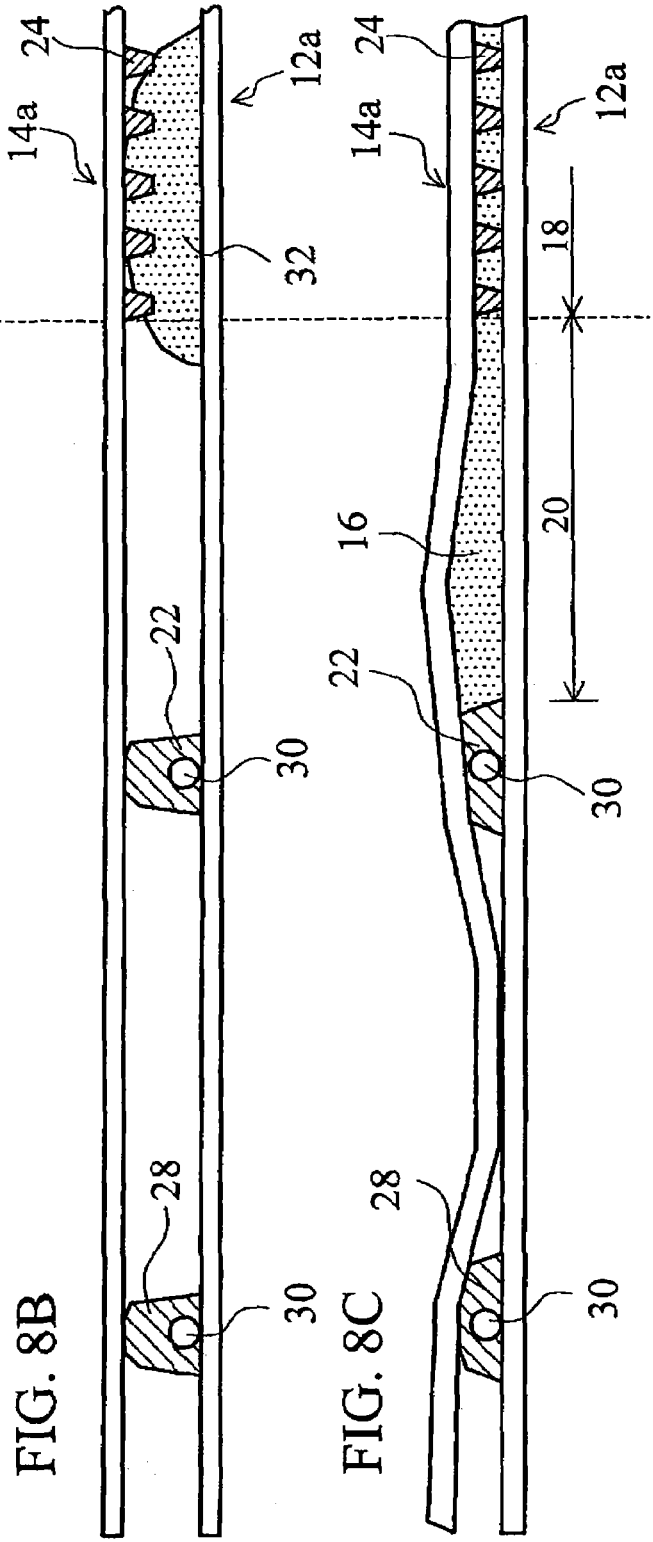

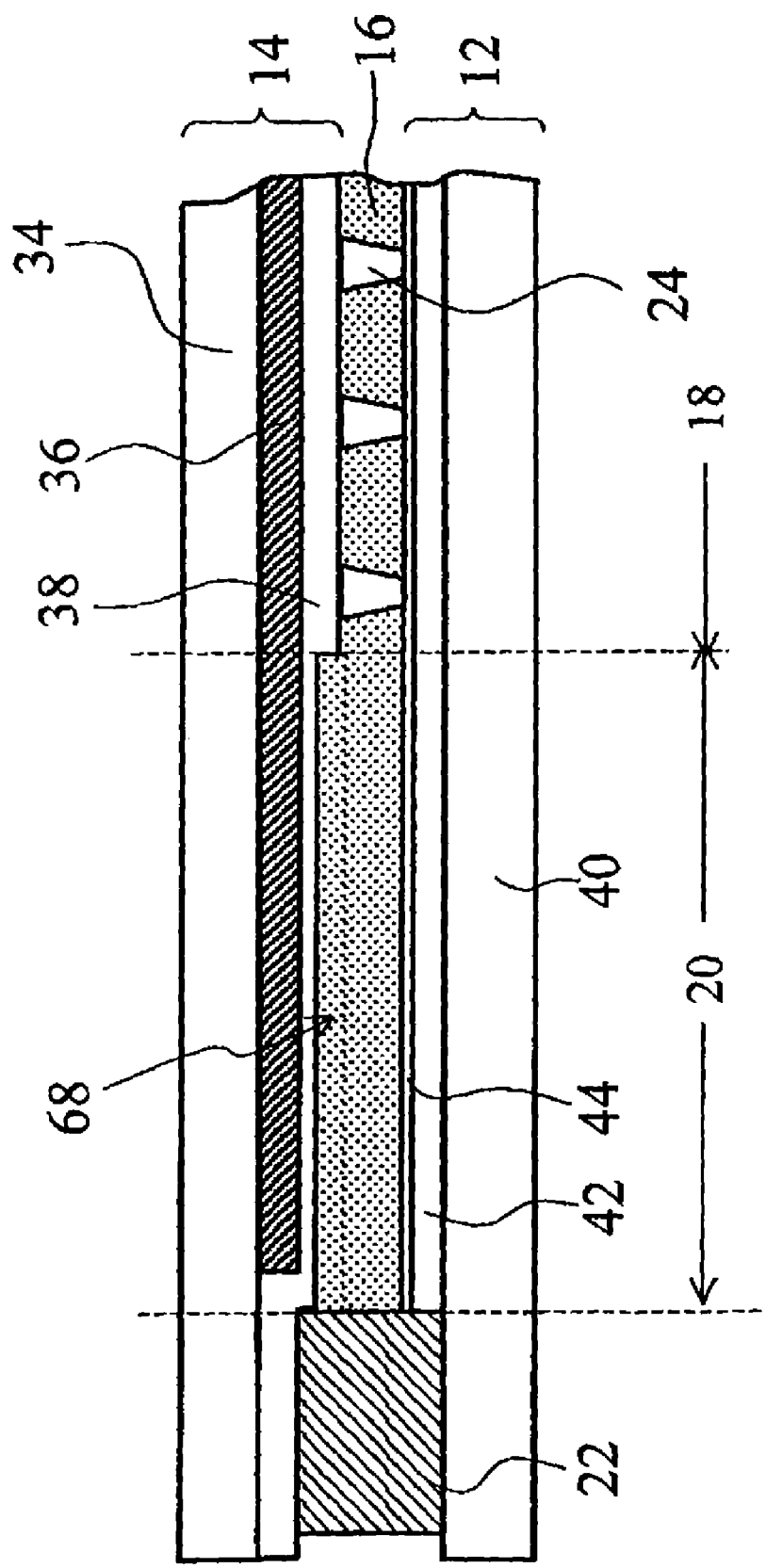

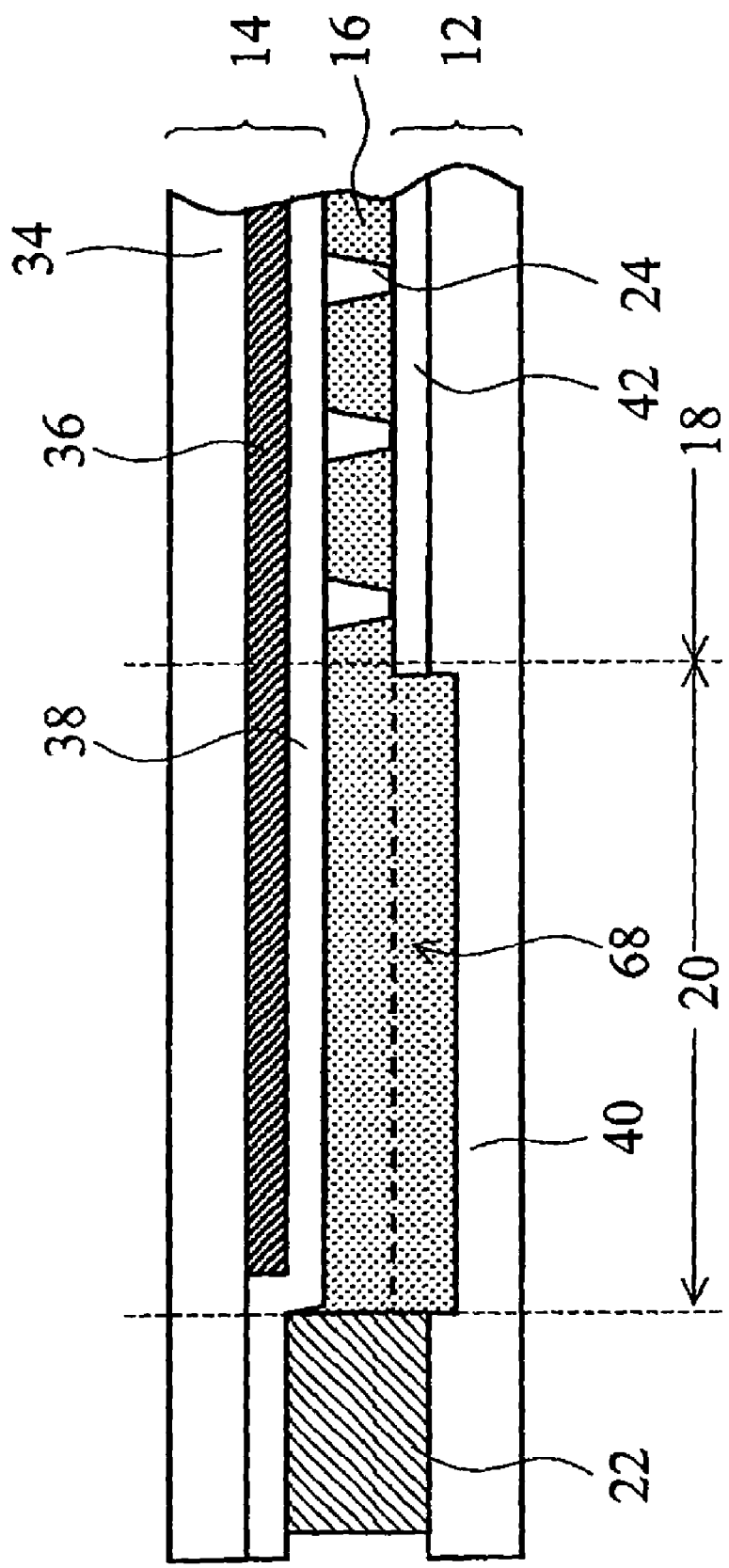

LIQUID-CRYSTAL DISPLAY DEVICE COMPRISING A DEPRESSION FORMED ON INNER SURFACE OF A SUBSTRATE FOR RECEIVING EXCESS LIQUID CRYSTAL

BACKGROUND OF THE INVENTION

1. Field of the Invention

The present invention relates to a liquid-crystal display (LCD) device. More particularly, the invention relates to a LCD device comprising a first substrate and a second substrate coupled with each other, a liquid crystal layer formed in the gap between the first and second substrates with a sealing member, and spacers arranged in the gap, in which the uniformity of the gap is improved.

2. Description of the Related Art

As known well, the LCD device has a liquid crystal layer formed between two substrates and a pair of polarizer plates located outside of each of the substrates. Data voltages are applied across the liquid crystal layer to control the light penetrating through the said layer, thereby displaying images on its screen according to the data voltages applied.

FIG. 1 shows the structure of a prior-art LCD device, which is disclosed in the Japanese Non-Examined Patent Publication No. 9-73093 published in Mar. 18, 1997.

This prior-art device comprises a Thin-Film Transistor (TFT) substrate 112, an opposite substrate 114, and a liquid crystal layer 116 sandwiched by the substrates 112 and 114. A polarizer plate (not shown) is located on the outer surface of the substrate 112 and another polarizer plate (not shown) is located on the outer surface of the substrate 114. The polarizing axes of these two polarizer plates are perpendicular to each other. The combination of the two substrates 112 and 114, the liquid crystal layer 116, and the two polarizer plates constitute a LCD panel 126. The device is constituted by the panel 126 and other necessary parts such as driving circuitry (not shown).

When the device is seen from its front, it has a rectangular display region 118 for displaying images, and a frame-shaped non-display region 120 that surrounds the display region 118. In the display region 118, pixels and TFTs are arranged in a matrix array. The substrates 112 and 114 are coupled together with a sealing member 122 formed along the periphery of the non-display region 120. The liquid crystal layer 116 is made of a specific liquid crystal filled into the gap between the substrates 112 and 114. The layer 116 is sealed by the member 122. To keep the gap between the substrates 112 and 114 (i.e., the inter-substrate gap) uniform, columnar spacers 124 are formed in the liquid crystal layer 116. These spacers 124 are arranged at regular intervals within the display and non-display regions 118 and 120.

FIG. 2 shows the state in a prior-art method of fabricating the LCD device shown in FIG. 1, in which a TFT substrate member 112a and an opposite substrate member 114a are coupled to each other to simultaneously form the two LCD panes 126. Thus, this method includes the two-panel formation step. The two panels 126 are located in the middle of the coupled members 112a and 114a to be adjacent to each other. The liquid crystal layer 116 is not yet formed between the members 112a and 114a at this state.

As seen from FIG. 2, each panel 126, which is sectioned by the rectangular sealing member 122, includes the columnar spacers 124 regularly arranged in both the display region 118 and the non-display region 120. To ensure a desired gap between the substrate members 112a and 114a in their coupling step and to facilitate the subsequent cutting operation of the coupled members 112a and 114a, columnar auxiliary spacers 124a and auxiliary sealing members 128 are additionally formed. The auxiliary sealing members 128 are located outside the two panes 126, which are in the peripheral area of the coupled members 112a and 114a. The auxiliary spacers 124a are located outside the two sealing members 128.

The spacers 124 and 124a are fixed on the opposite substrate 114. As seen from FIG. 2, the density of the spacers 124 in the non-display region 120 of each panel 126 is higher than that of the spacers 124 in the display region 118 thereof. Therefore, when the substrate members 112a and 114a are coupled to each other and the sealing members 122 and 128 are cured, the spacers 124 located in the non-display region 120 of each panel 126 will fully withstand the relatively stronger pressing force applied to the region 120 than that applied to the display region 118 thereof. This means that the inter-substrate gap of each panel 126 in its peripheral part is less than that in its middle part.

The above-identified Publication No. 9-73093 further discloses another structure that the thickness or diameter of the columnar spacers 124 in the non-display region 120 of each panel is greater than that of the spacers 124 in the display region 118 thereof. In this structure, the same advantages as shown above are obtainable.

Unlike the above-described situation, the inventor found a fact that "inter-substrate gap non-uniformity" occurs in the neighborhood of the sealing member in each panel. The "inter-substrate gap non-uniformity" means that the inter-substrate gap of each panel in its peripheral part near the sealing member is greater than that in its remaining part. The cause of the gap non-uniformity the inventor found will be explained below with reference to FIGS. 3A to 3D and FIGS. 4A to 4C.

With the known liquid-crystal injection method, which is used in the ordinary fabrication method of the LCD device, the columnar spacers 124 have been formed on the inner surface of the opposite substrate member 114a while the sealing members 122 and 128 have been formed on the inner surface of the TFT substrate member 112a, as shown in FIG. 3A. Each of the sealing members 122 has a rectangular plan shape and each of the auxiliary sealing members 128 has a U- or L-like plan shape, as shown in FIG. 2. Spherical in-seal spacers 130 are arranged in each of the members 122 and 128, as shown in FIG. 3A. Needless to say, the columnar spacers 124 may be formed on the inner surface of the TFT substrate member 112a while the sealing members 122 and 128 may be formed on the opposite substrate member 114a.

First, the substrate members 112a and 114a are coupled to each other with the sealing members 122 and 128 and then, these substrate members 112a and 114a are sandwiched by a pair of surface plates and applied with a pressing force by the plates. Alternately, the air existing in the gaps between the substrate members 112a and 114a is pumped out to reduce its inner pressure, thereby applying a pressing force to the members 112a and 114a thus coupled by the pressure difference in the atmospheric air. Due to the pressing force, the sealing members 122 and 128 and the opposite substrate member 114a are deformed and cured, thereby coupling the members 112a and 114a together and setting the gaps at their desired values. The state at this stage is shown in FIG. 3B.

In this coupling process, even if the applied pressing force is uniform over the whole substrate members 112a and 114a, the compressive deformation of the sealing members 122 and 128 is restricted due to the less deformation limits of the spacers 124. As a result, the gaps near the sealing members 122 and 128 are slightly larger than their desired value.

Subsequently, the coupled substrate members 112a and 114a are cut in such a way as to separate the two LCD panels 126. Then, a liquid crystal is injected into the gap of each panel 126 by way of its injection opening (not shown) penetrating the sealing member 122, thereby forming the liquid crystal layer 116 in the gap. In this injection process, the liquid crystal is injected until the opposite substrate 114 is slightly swelled out and the gap is somewhat larger than the height of the spacers 124, as shown in FIG. 3C.

To remove the extra liquid crystal from the gap, each panel 126 is sandwiched by a pair of surface plates and applied with a pressing force by the plates. Thus, the extra liquid crystal is pushed out from the gap by way of the injection opening. Finally, each panel 126 has the structure shown in FIG. 3D.

As seen from FIG. 3D, the inter-substrate gap between the TFT substrate 112 and the opposite substrate 114 is at its maximum value at the position of the sealing member 122 and at its desired value in the area away from the member 122. Since the inter-substrate gap decreases gradually from its maximum value to its desired value in the neighborhood of the member 122, a slope area S is formed in the opposite substrate 114. If the whole slope area S is located in the non-display region 120, no problem occurs. However, if part of the slope area S is located in the display region 118, as shown in FIG. 3D, a problem may occur. For example, if the slope angle of the area S in the display region 118 is equal to approximately 2% of the average value of the inter-substrate gap between two positions at an interval of 1 mm, a viewer recognizes the bad effect by the slope. This means that the image quality of the LCD device will degrade if the slope angle in the display region 118 satisfies the said relationship.

The image quality degradation will occur in the known liquid-crystal dropping and substrate coupling method as well, which is often used in the fabrication method of the LCD device. This is explained below with reference to FIGS. 4A to 4C.

Which one of the liquid-crystal injection method and the liquid-crystal dropping and substrate coupling method was used for fabricating a LCD device can be known by finding whether the injection opening exists in the sealing member or not. If the device has the injection opening in the sealing member, it is found that the device was fabricated by using the liquid-crystal injection method.

With the known liquid-crystal dropping and substrate coupling method, first, as shown in FIG. 4A, the columnar spacers 124 are formed on the inner surface of the opposite substrate member 114a while the sealing members 122 and 128 are formed on the inner surface of the TFT substrate member 112a. This is the same as in the liquid-crystal injection method shown in FIGS. 3A to 3D.

Thereafter, drops 132 of the liquid crystal are dropped onto the inner surface of the member 112a in each panel 126. Then, the opposite substrate member 114a is placed onto the TFT substrate member 112a in a vacuum atmosphere, thereby coupling the members 112a and 114a to each other with the sealing members 122 and 128, as shown in FIG. 4B. After the sealing members 122 and 128 are cured, the inside of the inter-substrate gap is kept in a vacuum state. Since the sealing member 122 needs to confine the drops 132 in the gap in this coupling process, the sealing member 122 has a higher viscosity than that of the member 122 used in the method of FIGS. 3A to 3D.

The substrate members 112a and 114a thus coupled are taken into the atmospheric air from the vacuum atmosphere. In this state, the members 112a and 114a are pressed by the atmospheric pressure. As a result, the inter-substrate gap is decreased and at the same time, the liquid-crystal drops 132 are expanded to form the liquid crystal layer 116, as shown in FIG. 4C. In this state, the peripheral area of each panel 126 is more difficult to be deformed than the middle area thereof. This is because the sealing member 122 is relatively higher in viscosity and because the spacers 124 near the member 122 provide resistance forces. As a result, the liquid crystal in the gap is likely to gather in the peripheral region of each panel 126. This means that the extra liquid crystal is likely to remain in the peripheral region near the member 122, keeping the gap at a larger value than the desired one near the sealing member 122.

As seen from FIG. 4C, the inter-substrate gap between the TFT substrate member 112a and the opposite substrate member 114a is at its maximum value at the position of the sealing member 122 and at its desired value in the area apart from the member 122. This is the same state as shown in FIG. 3D. Therefore, if part of the slope area S is located in the display region 118, as shown in FIG. 4C, the image quality of the LCD device will degrade.

SUMMARY OF THE INVENTION

Accordingly, an object of the present invention is to provide a LCD device that suppresses effectively the formation of the slope area in the display region.

Another object of the present invention is to provide a LCD device that prevents the image quality degradation caused by the slope area near the sealing member.

Still another object of the present invention is to provide a LCD device that prevents the gap non-uniformity in the display region with a simple measure.

The above objects together with others not specifically mentioned will become clear to those skilled in the art from the following description.

A LCD device according to the present invention comprises:

a first substrate on which pixels are arranged;

a second substrate coupled to the first substrate with a sealing member in such a way as to form a gap between the first and second substrates;

a liquid-crystal layer formed in the gap, the liquid crystal layer being confined by the sealing member; and spacers arranged in the liquid-crystal layer;

wherein the first substrate has a display region for displaying images, the display region being defined to include the pixels;

and wherein the first substrate has a non-display region formed outside the display region, the non-display region being located between the display region and the sealing member;

and wherein the spacers are located in a first part of the liquid-crystal layer corresponding to the display region while no spacer being located in a second part of the liquid-crystal layer corresponding to the non-display region.

With the LCD device according to the present invention, the first substrate has a display region defined to include the pixels and a non-display region formed outside the display region. The spacers are located in a first part of the liquid-crystal layer corresponding to the display region while no spacer being located in a second part of the liquid-crystal layer corresponding to the non-display region.

Therefore, no resistance force is generated by the spacers in the non-display region in the coupling process of coupling the first and second substrates to each other. This means that the sealing member can be easily deformed by the applied compressive force. Accordingly, the difference between the gap value at the position of the sealing member and the gap value in the display region is reduced or eliminated. In other words, the formation of the slope area in the display region is suppressed effectively.

As a result, the image quality degradation caused by the gap non-uniformity in the display region (i.e., the slope area near the sealing member) is eliminated with a simple measure.

The device according to the invention may be of a type fabricated by a liquid-crystal injection method or a type fabricated by a liquid-crystal dropping and substrate coupling method.

In a preferred embodiment of the device according to the invention, a depression is formed on an inner surface of the first or second substrate. The depression is located in the second part of the liquid-crystal layer, thereby forming a step between the display region and the non-display region. The depression constitutes a buffer space for the liquid crystal.

When the device is of a type fabricated by a liquid-crystal injection method, the gap non-uniformity will occur due to the extra liquid crystal left near the sealing member after the process of removing the extra liquid crystal, even if the gap has been formed uniform in the coupling process of the first and second substrates. In this embodiment, however, the extra liquid crystal will enter the depression. Thus, the possibility that the gap increases near the sealing member is reduced or eliminated.

When the device is of a type fabricated by a liquid-crystal dropping and substrate coupling method, like the type fabricated by a liquid-crystal injection method, the gap non-uniformity due to the extra liquid crystal left near the sealing member will not occur in the process of compressing the coupled first and second substrates by the atmospheric air. This is because the extra liquid crystal will enter the depression, i.e., the buffer space.

In another preferred embodiment of the device according to the invention, TFTs are arranged on the first substrate in such a way as to be electrically connected to the respective pixels. A dielectric layer (preferably, an organic dielectric layer) is formed on the first substrate to cover the TFTs and the pixels. The depression is formed in the dielectric layer. In this embodiment, there is an additional advantage that the buffer space is realized with a simple structure.

In the non-display region, the dielectric layer is unnecessary for electrical insulation of the TFTs and the pixels. Therefore, no problem occurs even if the depression is formed by selectively removing the dielectric layer in the non-display region.

In still another preferred embodiment of the device according to the invention, a dielectric layer (e.g., a dielectric overcoat layer) is formed on the second substrate. The depression is formed in the dielectric layer. In this embodiment, there is an additional advantage that the buffer space is realized with a simple structure.

In a further preferred embodiment of the device according to the invention, one of the first and second substrates comprises a transparent plate having a depressed part on its inner surface. The depression is formed by the depressed part of the plate. In this embodiment, there is an additional advantage that the buffer space is realized with a simple structure, because the depressive part of the plate is easily formed by selectively etching the plate with a proper etchant such as hydrofluoric acid.

In a still further preferred embodiment of the device according to the invention, when the non-display region has a width L(μm) and the gap in the display region has an average value d(μm), the step (i.e., the depression) has a height H satisfying a relationship of $$H \geq (1/2) \times (1000+L) \times [0.02d + [L \times (0.02d/1000)]/L(\mu m).$$

In this embodiment, there is an additional advantage that recognizable gap non-uniformity in the display region is effectively prevented.

In a still further preferred embodiment of the device according to the invention, the spacers are pole-shaped and formed on one of the first and second substrates.

BRIEF DESCRIPTION OF THE DRAWINGS

In order that the present invention may be readily carried into effect, it will now be described with reference to the accompanying drawings.

FIG. 5 is a schematic front view showing the state of a LCD device according to a first embodiment of the invention in a step of its fabrication method.

FIGS. 7A to 7D are partial schematic cross-sectional views of the LCD device according to the first embodiment of FIG. 5, respectively, which show the process steps of its fabrication method using the liquid-crystal injection method.

FIGS. 8A to 8C are partial schematic cross-sectional views of the LCD device according to the first embodiment of FIG. 5, respectively, which show the process steps of its fabrication method using the liquid-crystal dropping and substrate coupling method.

FIG. 12 is a partial schematic cross-sectional view of a LCD device according to a third embodiment of the invention.

FIG. 13 is a partial schematic cross-sectional view of a LCD device according to a fourth embodiment of the invention.

DETAILED DESCRIPTION OF THE PREFERRED EMBODIMENTS

Figure 1:
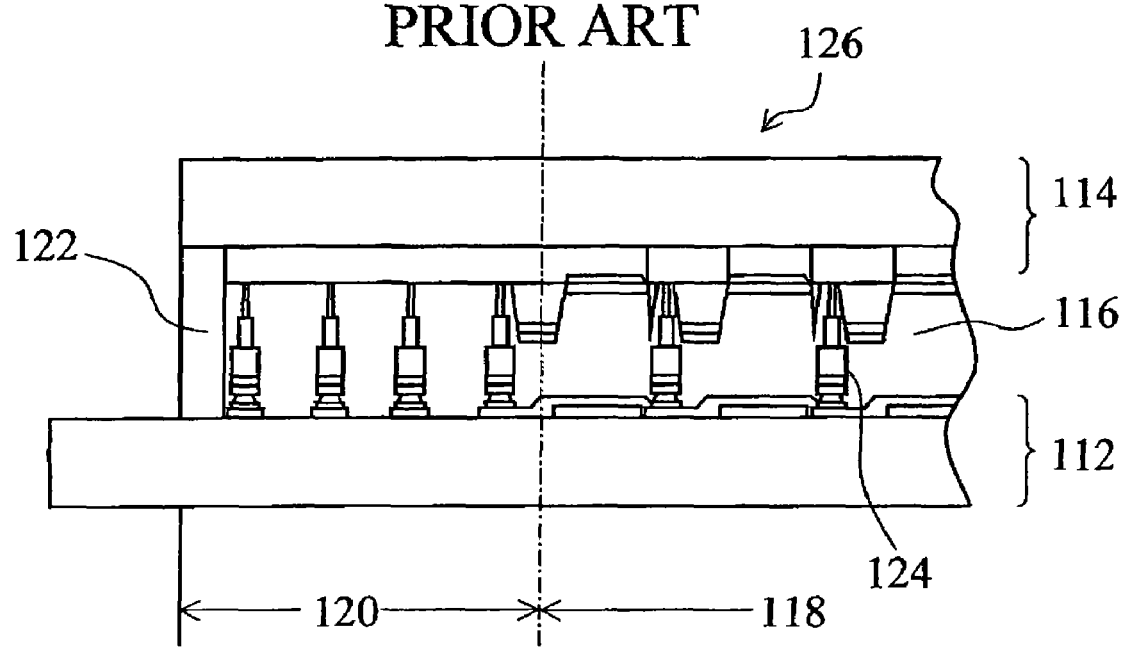
FIG. 1 is a partial schematic view showing the structure of a prior-art LCD device.
Figure 2:
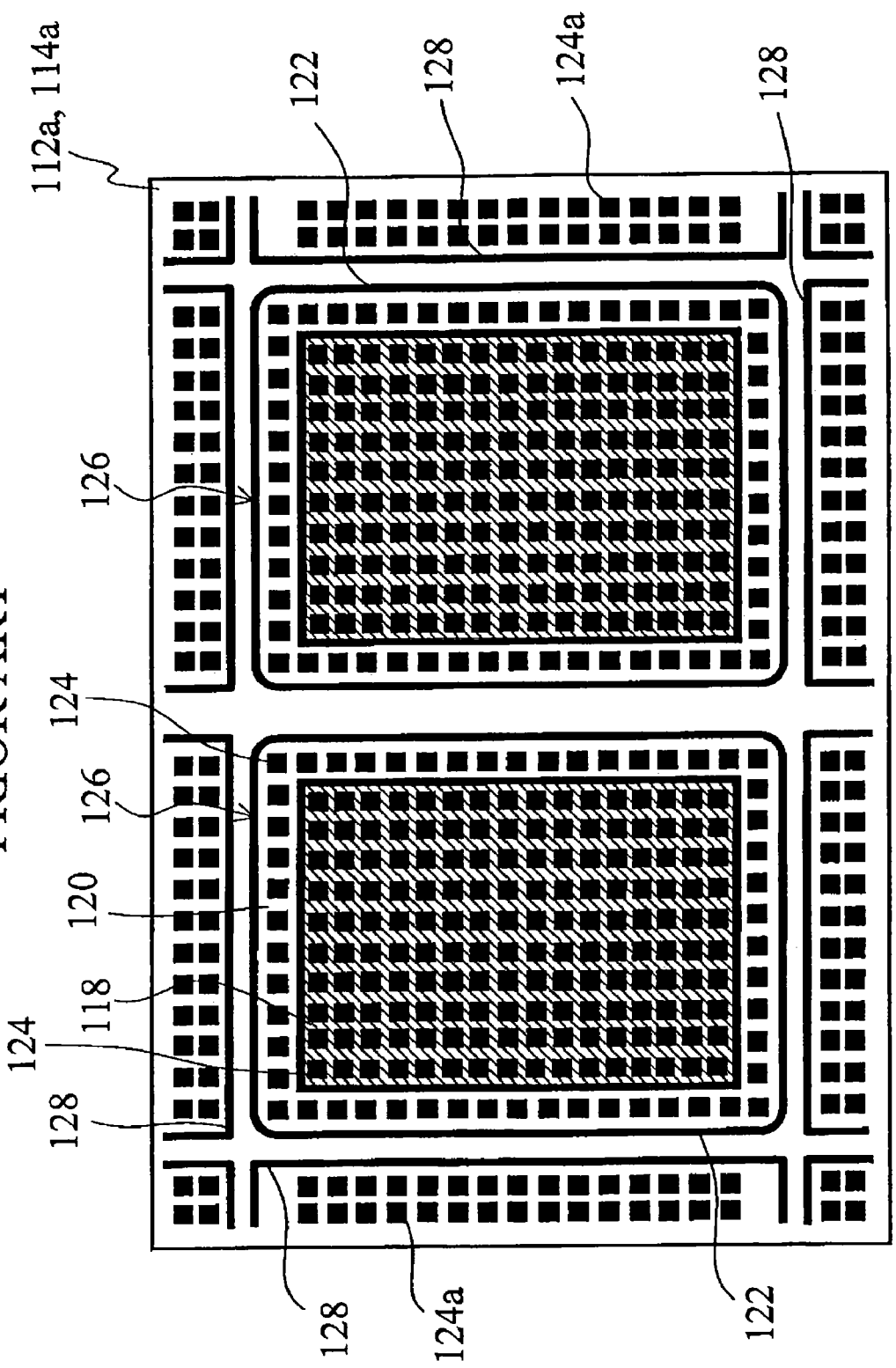
FIG. 2 is a schematic front view showing the state of the prior-art LCD device of FIG. 1 in a step of its fabrication method.
Figures 3A, 3B, 3C, 3D:
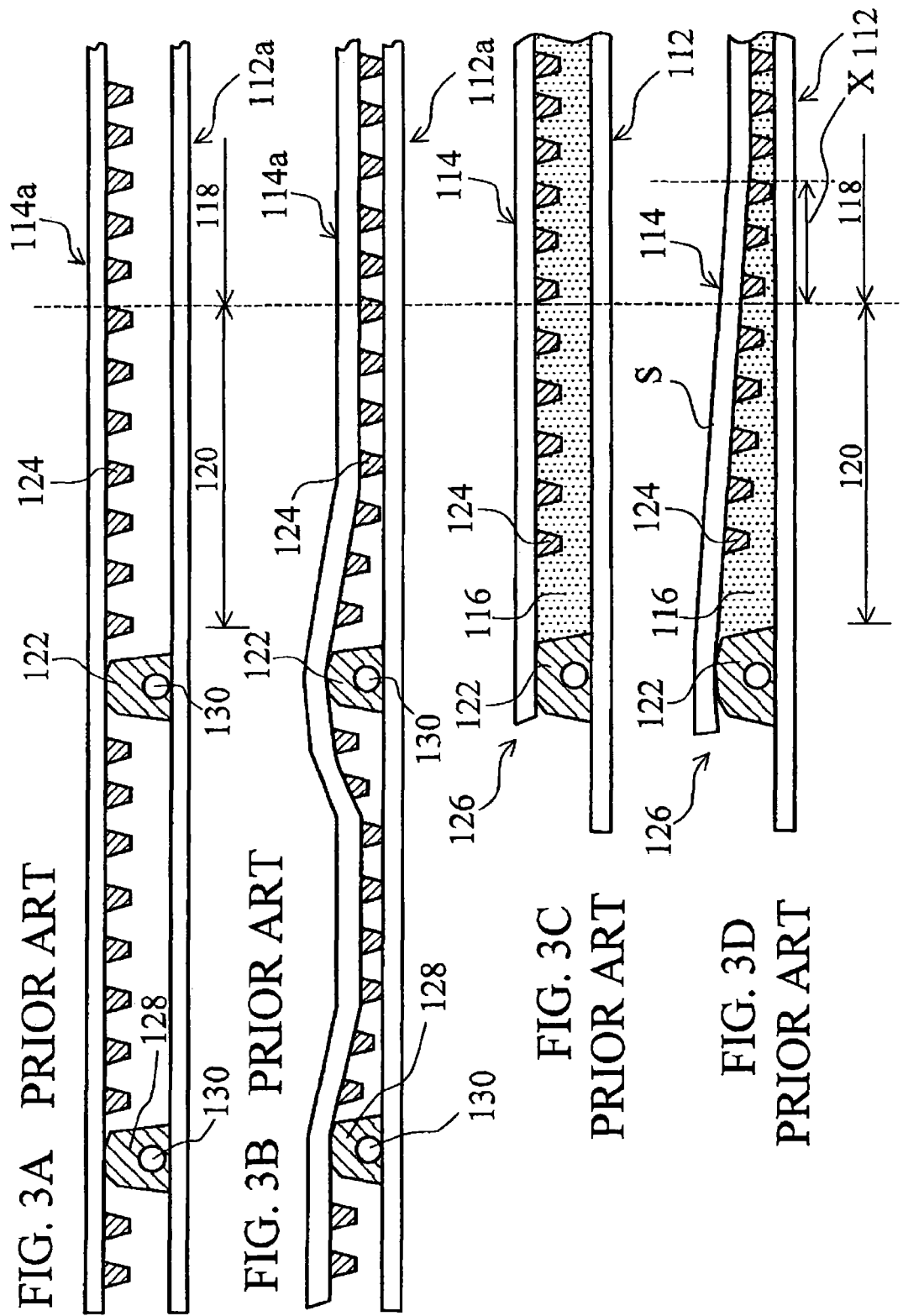
FIGS. 3A to 3D are partial schematic cross-sectional views of the prior-art LCD device of FIG. 1, respectively, which show the process steps of its fabrication method using the liquid-crystal injection method.
Figure 4A:
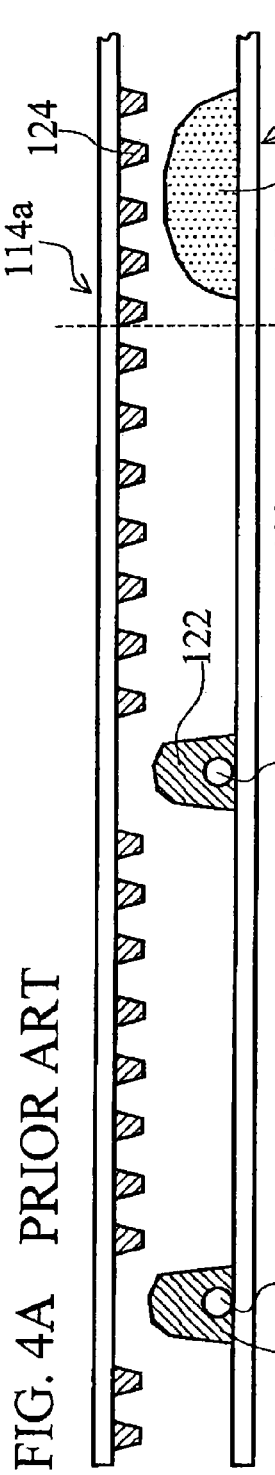
FIGS. 4A to 4C are partial schematic cross-sectional views of the prior-art LCD device of FIG. 1, respectively, which show the process steps of its fabrication method using the liquid-crystal dropping and substrate coupling method.
Figure 4B:
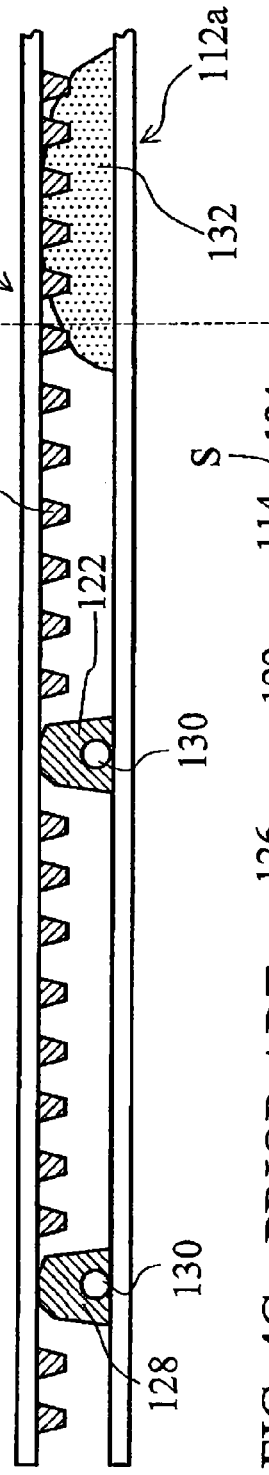
Figure 4C:
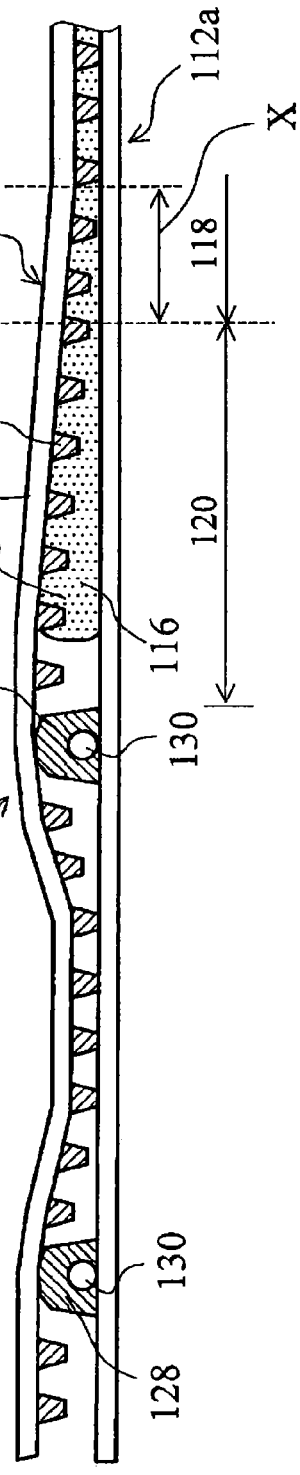

Preferred embodiments of the present invention will be described in detail below while referring to the drawings attached.

First Embodiment

Figure 6:
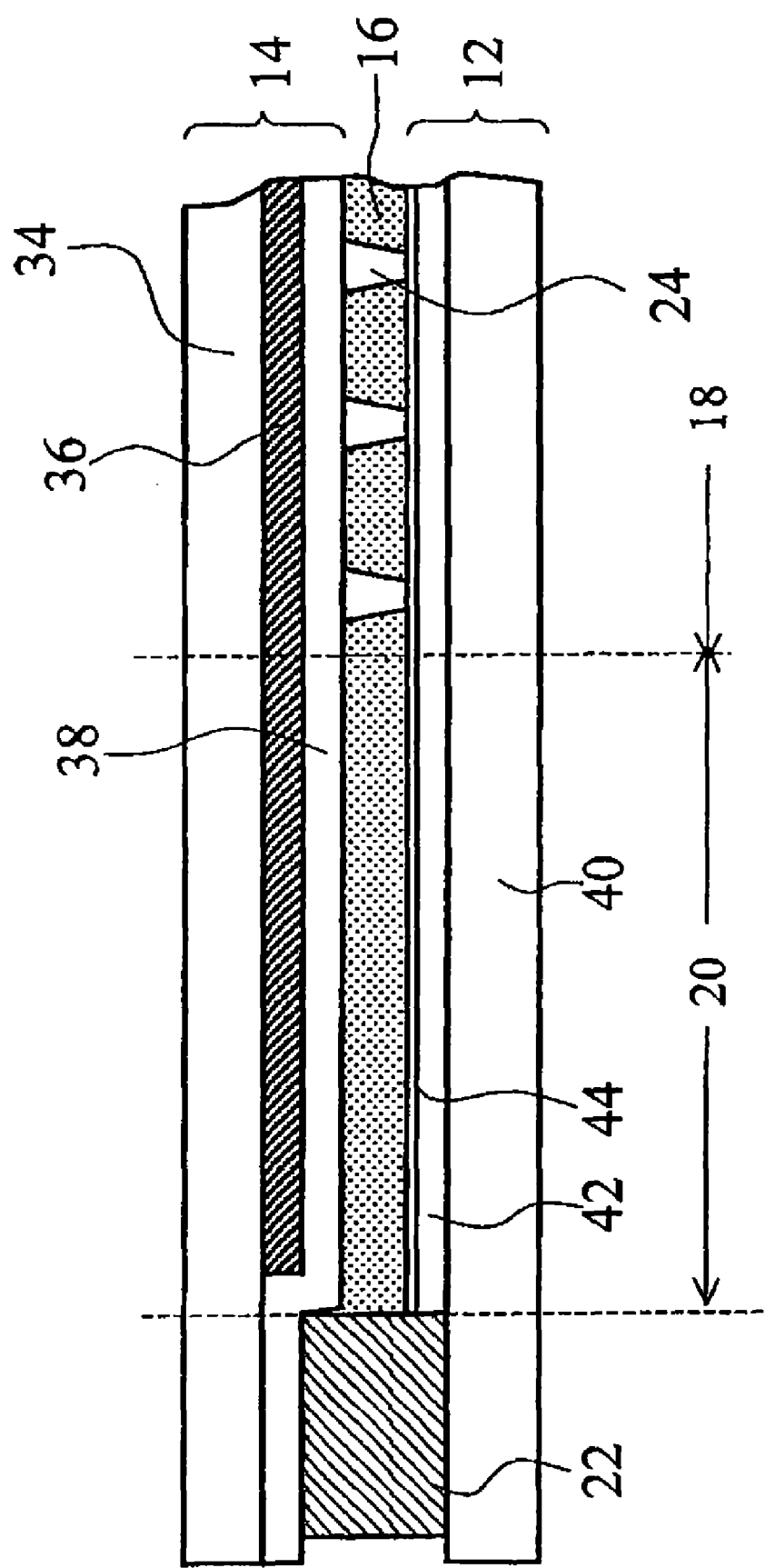
FIG. 6 is a partial schematic cross-sectional view of the LCD device according to the first embodiment of FIG. 5.

A LCD device according to a first embodiment of the invention has the structure shown in FIGS. 5 and 6.

FIG. 5 shows the state of the LCD device of the first embodiment in a step of its fabrication method. In FIG. 5, a TFT substrate member 12a and an opposite substrate member 14a are coupled to each other to simultaneously form two LCD panes 26. Thus, this method includes the two-panel formation step. The two panels 26 are located in the middle of the coupled substrate members 12a and 14a to be adjacent to each other. The liquid crystal layer is not yet formed between the members 12a and 14a at this state.

Each panel 26 comprises a rectangular display region 18 in which pixels and their TFTs are arranged in a matrix array, a sealing member 22 formed to define the outer edge of the LCD device, and a rectangular frame-shaped non-display region 20 formed between the outer edge of the display region 18 and the member 22. The width of the non-display region 20 is, for example, approximately 1000 to 5000 µm.

To ensure a desired gap (i.e., a uniform coupling state with the sealing member 22) between the substrate members 12a and 14a in their coupling step and to facilitate the subsequent cutting operation of the coupled members 12a and 14a, auxiliary sealing members 28 are additionally formed. The auxiliary sealing members 28 are located outside the two panes 26 (i.e., the two sealing members 22), which are in the peripheral area of the coupled members 12a and 14a. Unlike the above-described prior-art LCD device, no auxiliary spacers are provided.

As seen from FIG. 5, each panel 26, which is sectioned by the rectangular sealing member 22, includes the columnar spacers 24 formed in the display region 18. Here, these spacers 24 are arranged in a matrix array in only the display region 18 at intervals of 200 to 600 µm. Unlike the above-described prior-art device, no spacers are arranged in the non-display region 20 and the remaining area other than the panels 26. Since no spacers are provided in the non-display region 20, the external compressive force can be fully applied to the sealing member 22 in the neighborhood of the member 22. In other words, the shortage of the applied compressive force in the neighborhood of the member 22 does not occur, when coupling the substrate members 12a and 14a to each other and curing the sealing member 22. Thus, the sealing member 22 can be compressively deformed until a desired gap is formed in the neighborhood of the member 22. As a result, even if the coupled substrate members 12a and 14a are subjected to the subsequent liquid-crystal injection process, the gap having its desired value does not increase due to the cured member 22 even in the neighborhood of the member 22. This means that the gap non-uniformity, which is likely to occur in the peripheral part of the display region 18, is prevented.

Here, before the coupling process of the substrate members 12a and 14a, the spacers 24 are fixed on the opposite substrate 14, and the sealing member 22 is formed on the TFT substrate 12. However, the invention is not limited to this. The spacers 24 may be fixed on the TFT substrate 12 or fixed on both the substrates 12 and 14. Similarly, the sealing member 22 may be formed on the opposite substrate 14.

FIG. 6 shows a partial cross section of the LCD device according to the first embodiment. As shown in FIG. 6, the LCD device of the first embodiment comprises a TFT substrate 12, an opposite substrate 14, and a liquid crystal layer 16 sandwiched by the substrates 12 and 14. The substrates 12 and 14 are coupled together with the sealing member 22 located along their outer edges.

A polarizer plate (not shown) is located on the outer surface of the TFT substrate 12 and another polarizer plate (not shown) is located on the outer surface of the opposite substrate 14. The polarizing axes of these two polarizer plates are perpendicular to each other. The combination of the substrates 12 and 14, the liquid crystal layer 16, and the two polarizer plates constitute the LCD panel 26. The LCD device of the first embodiment comprises the said panel 26 and necessary driving circuitry.

The opposite substrate 14 comprises a rectangular glass plate 34, a black matrix (i.e., a light-shielding layer) 36 formed on the inner surface of the plate 34, an overcoat layer 38 formed on the inner surface of the plate 34 to cover the black matrix 36, and the spacers 24 formed in a matrix array on the overcoat layer 38. The black matrix 36 shields almost all the non-display region 20 and selectively shields the areas (in which signal lines and other wiring lines are located) among the respective pixels in the display region 18.

The TFT substrate 12 comprises a glass plate 40, a dielectric overcoat layer 42 formed on the inner surface of the plate 40 to cover the pixels and the TFTs, and an alignment layer 44 formed on the overcoat layer 42.

With the device according to the first embodiment, the sealing member 22 has been compressed to the desired height, thereby forming the desired gap in the neighborhood of the member 22. Therefore, the gap having its desired value is uniformly realized over the entirety of the coupled substrates 12 and 14. This means that the formation of the unwanted slope area S in the display region 18 is effectively suppressed, in other words, the image quality degradation caused by the slope area S is prevented. In this way, the gap non-uniformity in the display region 18 is prevented with a simple measure in the LCD device according to the first embodiment.

Next, a method of fabricating the LCD device according to the first embodiment is explained below with reference to FIGS. 7A to 7D. In this method, the liquid-crystal injection method is used.

As shown in FIG. 7A, the columnar spacers 24 have been arranged in a matrix array on the inner surface of the opposite substrate member 14a only in the display region 18. Needless to say, the spacers 24 may be formed on the inner surface of the TFT substrate member 12a. On the TFT substrate member 12a, the pixels and their TFTs (both not shown) are arranged in a matrix array.

First, the sealing members 22 and 28 are formed on the inner surface of the TFT substrate member 12a outside the display region 18. Each of the sealing members 22 has a rectangular plan shape and each of the auxiliary sealing members 28 has a U- or L-like plan shape, as shown in FIG. 5. Spherical in-seal spacers 30 are arranged in each of the members 22 and 28, as shown in FIG. 7A. The sealing members 22 and 28 may be formed on the opposite substrate member 14a.

Next, the opposite substrate member 14a is placed on the TFT substrate member 12a to couple together with the sealing members 22 and 28. Then, the substrate members 12a and 14a thus coupled are sandwiched by a pair of surface plates and applied with a pressing force by the plates. Alternately, the air existing in the gaps between the substrate members 12a and 14a is pumped out to reduce its inner pressure, thereby applying a pressing force to the members 12a and 14a thus coupled by the pressure difference. Due to the pressing force applied, the sealing members 22 and 28 and the opposite substrate member 14a are compressively deformed and cured, thereby coupling the members 12a and 14a together and setting the gaps at their desired values. The state at this stage is shown in FIG. 7B.

In this coupling process, the applied pressing force is uniform over the whole substrate members 12a and 14a and therefore, the gap between the substrate members 12a and 14a in the display region 18 is reduced to a desired gap value, which is defined by the height of the spacers 24. At the same time, the sealing members 22 and 28 are compressively deformed until the gap between the substrate members 12a and 14a at the members 22 and 28 reaches the same desired value as that in the display region 18, which is defined by the interval of the pair of surface plates.

Since the spacers 24 are not located in the non-display region 20 and its outer region, the substrate member 14a is fully deformed by the applied compressive force. As a result, the gap between the substrate members 12a and 14a in the non-display region 20 and its outer region is decreased to a value less than the desired value, as shown in FIG. 7B. For example, the resultant gap in the non-display region 20 and its outer region may be equal to approximately zero.

Subsequently, the coupled substrate members 12a and 14a are cut in such a way as to separate the two LCD panels 26. Then, a liquid crystal is injected into the gap of each panel 26 by way of its injection opening (not shown) penetrating the sealing member 22, thereby forming the liquid crystal layer 16 in the gap. In this injection process, the liquid crystal is injected until the opposite substrate 14 is slightly swelled out and the gap is somewhat larger than the height of the spacers 24, as shown in FIG. 7C. Thus, after the injection process is completed, the gap between the TFT and opposite substrates 12 and 14 at the sealing member 22 is equal to the value defined by the height of the spacers 24 (i.e., the desired gap value). The gap between the substrates 12 and 14 in the display region 18 is greater than the desired gap value. The opposite substrate 14 is slightly swelled out in the non-display region 20 and therefore, the gap increases gradually from the desired value to the value in the display region 18. A slope area is formed outer surface of the opposite substrate 14 in the non-display region 20.

To remove the extra liquid crystal from the gap, each panel 26 is sandwiched by a pair of surface plates and applied with a pressing force by the plates. Thus, the extra liquid crystal is pushed out from the gap by way of the injection opening, thereby eliminating the swelling of the substrate 14.

At this stage, each panel 26 has the structure shown in FIG. 7D, in which the inter-substrate gap is approximately equal to the value defined by the height of the spacers 24 (i.e., the desired gap value) in the display region 18, the non-display region 20, and in the neighborhood of the sealing member 22.

As seen from the above explanation, the gap non-uniformity in the display region 18 is prevented with a simple measure, when the LCD device of the first embodiment is of the type fabricated by the liquid-crystal injection method.

Next, another method of fabricating the LCD device according to the first embodiment is explained below with reference to FIGS. 8A to 8C. In this method, the liquid-crystal dropping and substrate coupling method is used.

As shown in FIG. 8A, the columnar spacers 124 have been arranged on the inner surface of the opposite substrate member 14a only in the display region 18. On the TFT substrate member 12a, the pixels and their TFTs (both not shown) have been arranged in a matrix array. This is the same as in the liquid-crystal injection method shown in FIGS. 7A to 7D.

First, the sealing members 22 and 28 are formed on the inner surface of the TFT substrate member 12a outside the display region 18. Spherical in-seal spacers 30 are arranged in each of the members 22 and 28, as shown in FIG. 8A. This is the same as in the liquid-crystal injection method shown in FIGS. 7A to 7D.

Next, drops 32 of the liquid crystal are dropped onto the inner surface of the TFT substrate member 12a in each panel 126. Thereafter, the opposite substrate member 14a is placed on the TFT substrate member 12a in a vacuum atmosphere, thereby coupling the members 12a and 14a to each other with the sealing members 22 and 28, as shown in FIG. 8B. After the sealing members 22 and 28 are adhered to the member 14a, the inside of the inter-substrate gap is kept in a vacuum state. Since the sealing member 22 needs to confine the drops 32 in the gap in this coupling process, the sealing member 22 has a higher viscosity than that of the member 22 used in the method of FIGS. 7A to 7D.

The substrate members 12a and 14a thus coupled are taken into the atmospheric air from the vacuum atmosphere. In this state, the members 12a and 14a is subjected to a pressing process. In this pressing process, the whole members 12a and 14a are pressed by the atmospheric pressure. Since the pressing force applied by the atmospheric pressure is uniform over the whole substrate members 12a and 14a, the gap between the substrate members 12a and 14a in the display region 18 is reduced to a desired gap value defined by the height of the spacers 24, as shown in FIG. 8C. At the same time, the sealing members 22 and 28 are compressively deformed until the gap at the members 22 and 28 reaches the same desired value as that in the display region 18. This is because the spacers 24 are not provided in the non-display region 20 and its outer region.

As a result, as shown in FIG. 8C, the inter-substrate gap is decreased to the desired value in the display region 18 and in the neighborhoods of the sealing members 22 and 28. In the region between the members 22 and 28, the gap is decreased to less values than the desired one or approximately zero. In the non-display region 20, the opposite substrate member 14a is slightly swelled out and therefore, the gap is increased to greater values than the desired one. The swelling of the member 14a is caused by the liquid-crystal drops 32 expanding outwardly to form the liquid crystal layer 16 due to the applied pressure.

Because of the swelling of the member 14a, unwanted slope areas (which induces the gap non-uniformity) are formed in the neighborhood of the outer edge of the display region 18. However, the slope areas are sufficiently narrower than that observed in the above-described prior-art device. Therefore, no problem relating to the display quality degradation occurs.

As seen from the explanation, the gap non-uniformity in the display region 18 is prevented with a simple measure, when the LCD device of the first embodiment is of the type fabricated by the liquid-crystal dropping and substrate coupling method.

Second Embodiment

Figure 9:
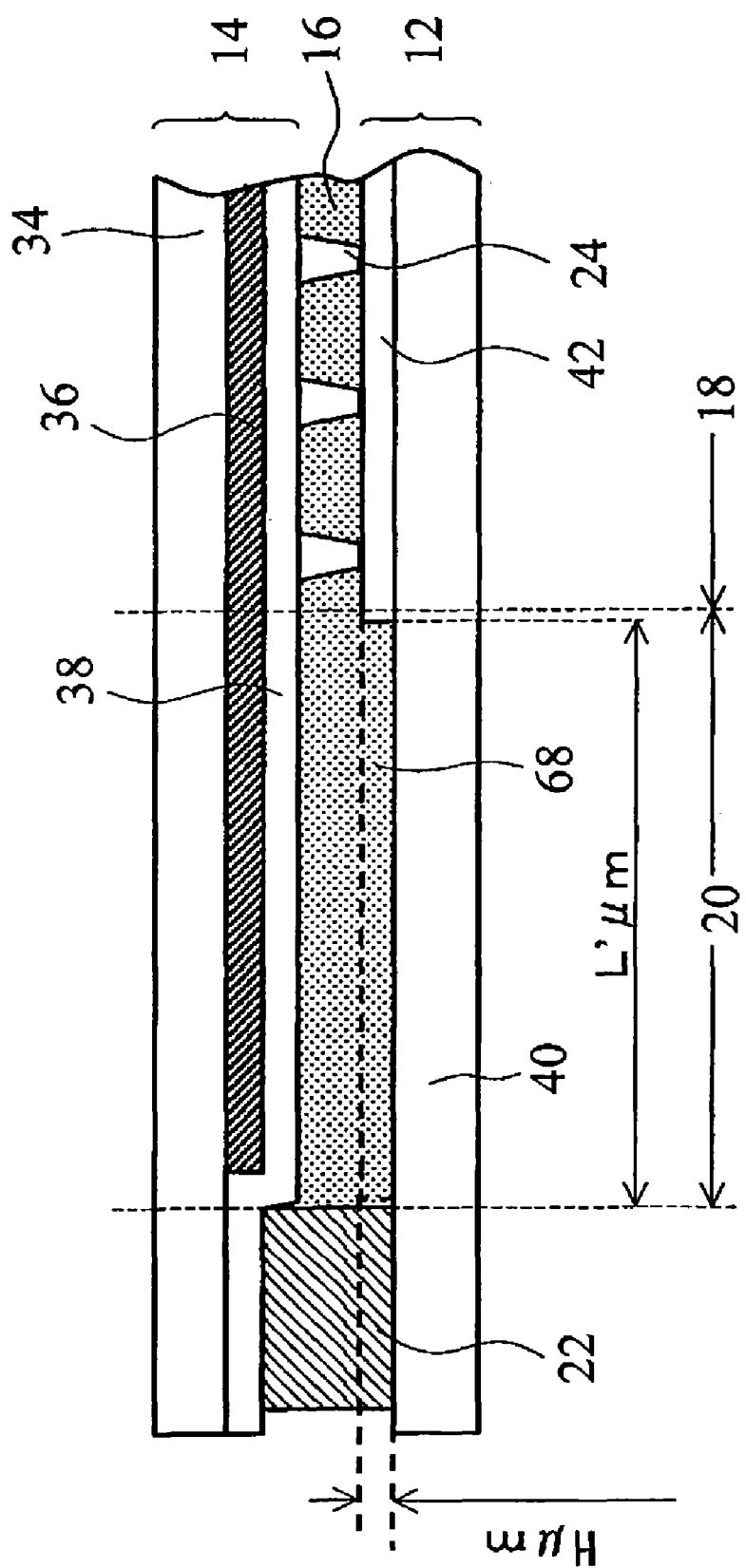
FIG. 9 is a partial schematic cross-sectional view of a LCD device according to a second embodiment of the invention.

FIG. 9 shows a LCD device according to a second embodiment of the invention, which has the same structure as the device of the first embodiment shown in FIG. 6, except that a buffering space 68 is additionally formed in the gap between the TFT and opposite substrates 12 and 14. Therefore, the explanation about the same structure is omitted here for the sake of simplification by attaching the same reference symbols as those used in the first embodiment to the same or corresponding elements.

Since the device of the second embodiment has the same structure except for the space 68, it has not only the same advantages as those in the first embodiment but also an additional advantage that a uniform gap is easily obtainable between the substrates 12 and 14 in the whole device.

The buffering space 68 is used for receiving the extra liquid crystal confined in the inter-substrate gap. Thus, the gap is more likely to be uniform in the whole device compared with the first embodiment. The space 68 is formed, for example, by selectively etching the dielectric overcoat layer 42. In FIG. 9, the alignment layer 44 is omitted.

Figure 10:
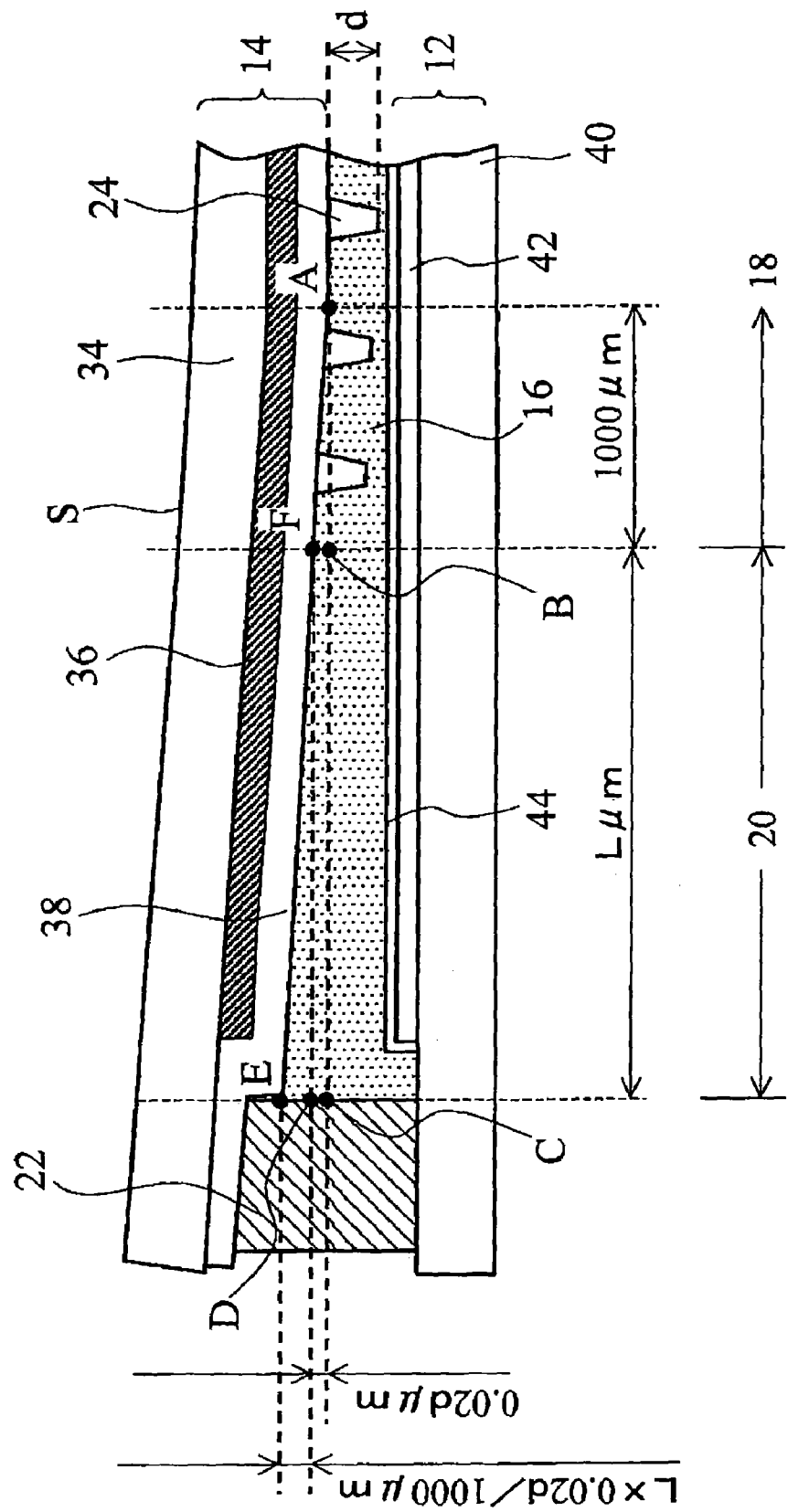
FIG. 10 is a detailed, partial schematic cross-sectional view of the LCD device according to the invention, which shows the volume calculation of the buffer space (i.e., the step height between the display region and the non-display region).

FIG. 10 is presented to explain the method of calculating an appropriate volume of the buffering space 68.

In general, if the slope angle in the display region 18 is equal to 2% of the average value of the inter-substrate gap between two positions at an interval of 1 mm, a viewer recognizes the effect by the slope, i.e., the gap-non-uniformity. Therefore, if the extra liquid crystal that induces gap-non-uniformity is entirely received in the buffering space 68, the gap-non-uniformity is prevented. A proper amount of the space 68 can be obtained in the following way.

Here, the desired gap value defined by the height of the spacers 24 is set at d (e.g., 4 μm) and the width of the non-display region 20 (i.e., the distance between the points B and C) is set at L (e.g., 5000 μm). Supposing that the gap non-uniformity recognizable by a viewer is at its minimum level, the slope angle in the display region 18 is equal to 2% of the average value of the inter-substrate gap between two positions at an interval of 1 mm, as described previously. In the device structure of FIG. 10, a gap difference of (0.02×d) μm is formed by the slope area S of the opposite substrate 14 between the point B (i.e., the outer edge of the display region 18) and the point A (i.e., the point apart inwardly from the said edge by 1 mm or 1000 μm). This means that the gap difference between the points B and F is (0.02×d) μm. Supposing that the slope of the inner surface of the substrate 14 is linear, the gap difference between the point C (i.e., the point located on the same plane as the points A and B and at the inner edge of the sealing member 22) and the point D (the point located on the same plane as the point F and at the inner edge of the sealing member 22) is expressed as [(L×0.02×d)/1000] μm.

Therefore, the volume per horizontal unit length (i.e., 1 μm along the direction perpendicular to the drawing paper) of the extra liquid crystal causing the gap difference of [(L×0.02d)/1000] μm is given by the volume V of the triangular pillar ACE with a horizontal unit length. Here, the point E is located on the same plane as the slope AF and at the inner edge of the sealing member 22. Specifically, the base length of the triangle is (1000+L) μm and the height thereof is [0.02d+[(L×0.02d)/1000]] and therefore, the volume V is expressed as $$V = (1/2) \times (1000+L) \times [0.02d + [(L \times 0.02d)/1000]] \; (\mu m^3) \quad (1)$$

To receive the extra liquid crystal with the volume V given by the equation (1) by the buffering space 68, the volume V' of the space 68 needs to be equal to V or greater, i.e., V'≧V.

When the space 68 is rectangular in cross section and has a width L' (L'≦L), as shown in FIG. 9, the height H of the space 68 needs to satisfy the relationship of $$H \geq (1/2) \times (1000+L) \times [0.02d + [L \times (0.02d/1000)]]/L' (\mu m) \quad (2)$$

Figure 11:
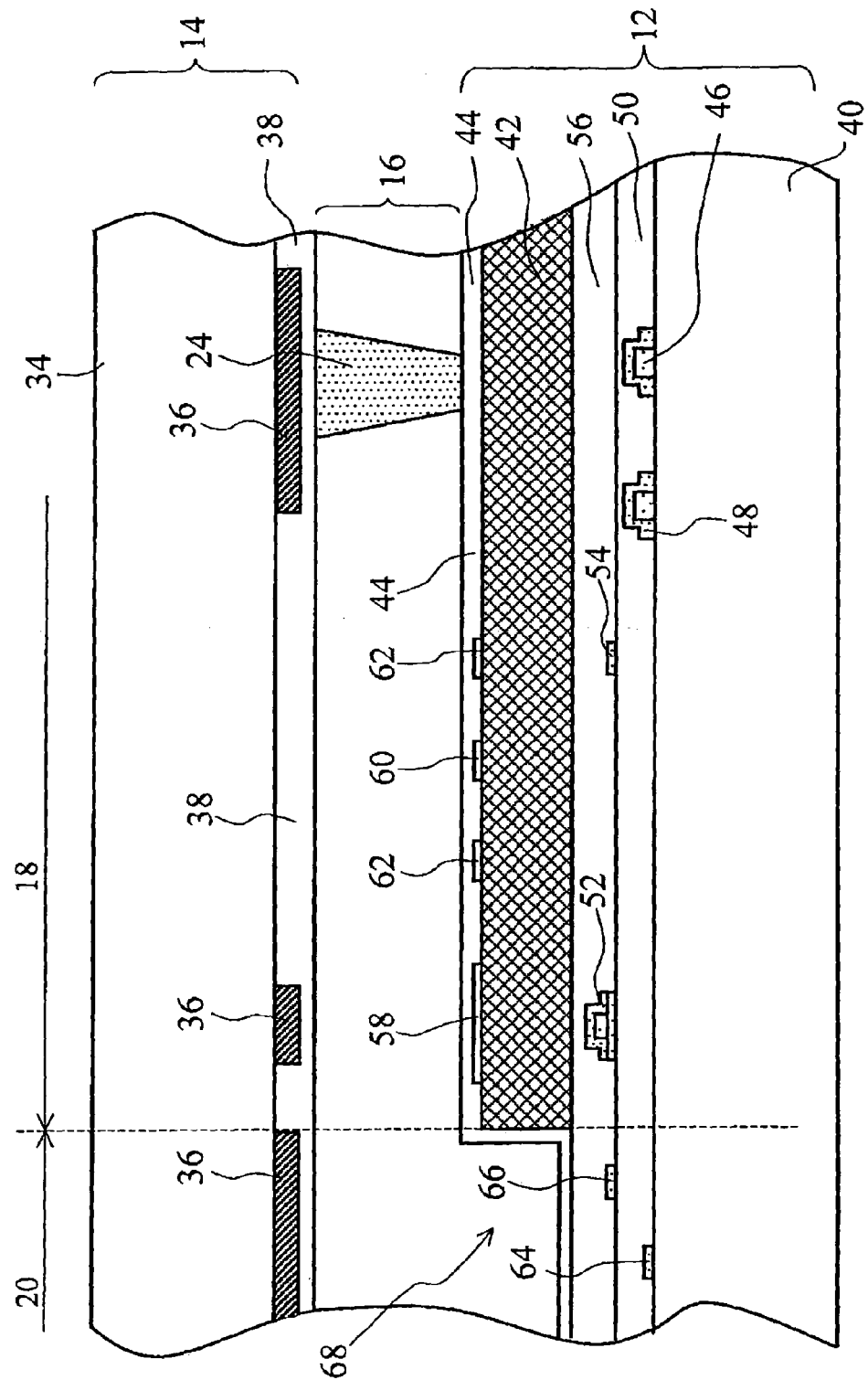
FIG. 11 is an enlarged, partial schematic cross-sectional view of the LCD device according to the second embodiment of FIG. 9, which shows its detailed structure.

FIG. 11 shows the detailed structure of the LCD device according to the second embodiment.

The opposite substrate 14 comprises a glass plate 34, a black matrix 36 formed on the inner surface of the plate 34, and a dielectric overcoat layer 38 formed to cover the black matrix 36. The black matrix 36 shields almost all the non-display region 20 and selectively shields the areas (in which signal lines and other wiring lines are located) among the respective pixels in the display region 18.

The TFT substrate 12 comprises a glass plate 40. In the display region 18, scanning lines 46 and common electrode lines 48 are formed on the inner surface of the plate 40. A gate dielectric layer 50 is formed on the inner surface of the plate 40 to cover the lines 46 and 48. Signal lines 52 and in-pixel storage capacitor lines 54 are formed on the gate dielectric layer 50. A protection layer 56 is formed on the gate dielectric layer 50 to cover the lines 52 and 54. An organic dielectric layer 42 is formed on the protection layer 56. Transparent electrodes (each of which comprises a shielding common electrode 58, a common electrode 60, and a pixel electrode 62) are formed on the organic dielectric layer 42. An alignment layer 44 is formed on the organic dielectric layer 42 to cover the electrodes 58, 60, and 62.

Each of the common electrode 48 and the scanning lines 46 has a stacked structure that a chromium (Cr) layer covers the top and side faces of an underlying (Al) aluminum layer. Each of the signal lines 52 has a three-layer structure made of a lower Cr sublayer, an Al layer, and an upper Cr layer.

In the non-display region 20 of the TFT substrate 12, leading lines 64 and 66 are formed. The leading lines 64 are in the same level as the common electrode lines 48 and the scanning lines 46. The leading lines 66 are in the same level as the signal lines 52. The protection layer 56 and the alignment layer 44 cover the non-display region 20 as well. As seen from FIG. 11, the organic dielectric layer 42 is selectively removed to form the buffering space 68 in the region 20. Therefore, the alignment layer 44 is directly contacted with the protection layer 56.

The liquid-crystal layer 16 is formed between the substrates 12 and 14. The columnar spacers 24 are regularly arranged in the layer 16. The spacers 24, which are fixed to the overcoat layer 38 at their bottoms, are contacted with the alignment layer 44 at their tops.

The opposite substrate 14 is fabricated in the following way.

First, a material for the black matrix 36 is coated on the surface of the glass plate 34. The plate 34 is subjected to a pre-bake process and a patterning process (which includes the exposure, development, and curing steps), thereby forming the black matrix 36. Thereafter, a color filter (not shown) is formed on the black matrix 36 by way of the coating, pre-bake, exposure, development, and curing steps for each of red, green, and blue colors. A material for the overcoat layer 38 is coated and cured, thereby forming the overcoat layer 38 on the plate 14 to cover the matrix 36. A material for the spacers 24 is coated on the overcoat layer 38 and patterned by the exposure, development, and curing steps, thereby forming the columnar spacers 24 on the layer 38.

When the black matrix 36 is made of metal, a metal layer is formed on the whole inner surface of the plate 34 and then, it is patterned to form the desired shape by way of the resist coating, exposure, development, etching, and resist removal steps.

The TFT substrate 12 is fabricated in the following way.

First, an Al layer is deposited on the whole surface of the glass plate 40 and then, it is patterned to form the desired shape by way of the resist coating, exposure, development, etching, and resist removal steps. Next, a Cr layer is deposited over the whole surface of the glass plate 40 and then, it is patterned to form the desired shape in the same way. Thus, the common electrode 48 and the scanning lines 46 are formed. An inorganic dielectric layer is formed over the whole plate 40, thereby forming the gate dielectric layer 50 on the plate 40.

Subsequently, an amorphous silicon (a-Si) layer and a n-type a-Si layer are successively formed on the gate dielectric layer 50 and then, they are patterned by way of the resist coating, exposure, development, etching, and resist removal steps.

A Cr layer and an Al layer are successively deposited on the whole gate dielectric layer 50 to cover the (a-Si) layer and the n-type a-Si layer. The Al layer is selectively etched by way of the resist coating, exposure, development, etching, and resist removal steps. The in-pixel storage lines 54 are formed by only the Cr layer. Next, a Cr layer is deposited over the whole gate dielectric layer 50. Thereafter, the lower Cr layer, the Al layer, and the upper Cr layer thus deposited are patterned by way of the resist coating, exposure, development, etching, and resist removal steps, thereby forming the signal lines 52 with the three-layer structure on the layer 50.

The n-type a-Si layer and the a-Si layer are selectively etched to complete the structure of each TFT. Thereafter, a dielectric layer as the protection layer 56 is formed on the gate dielectric layer 50 to cover the TFTs and the signal lines 52 and the in-pixel storage lines 54. The organic dielectric layer 42 is formed on the layer 56 by way of the coating and baking steps. The layer 42 is made of a photosensitive resin material and therefore, necessary contact holes are formed to penetrate the same directly by way of the exposure and development steps. The part of the layer 42 in the non-display region 20 is selectively removed by etching, thereby forming the buffering space 68. Subsequently, an ITO (Indium Tin Oxide) layer is formed on the whole surface of the layer 42 and then, it is patterned by way of the resist coating, exposure, development, etching, and resist removal steps, thereby forming the transparent electrodes 58, 60, and 62 on the layer 42. Finally, the alignment layer 44 is formed on the layer 42 and the exposed part of the protection layer 56.

Third Embodiment

FIG. 12 shows a LCD device according to a third embodiment of the invention, which has the same structure as the device of the first embodiment shown in FIG. 6, except that a buffering space 68 is additionally formed in the gap between the TFT and opposite substrates 12 and 14. The space 68 is realized by selectively removing the dielectric overcoat layer 38 on the opposite substrate 14, which is unlike the device of the second embodiment of FIG. 9.

Therefore, the explanation about the same structure is omitted here for the sake of simplification by attaching the same reference symbols as those used in the first embodiment to the same or corresponding elements.

Obviously, the device of the third embodiment has the same advantages as those of the second embodiment.

Fourth Embodiment

FIG. 13 shows a LCD device according to a fourth embodiment of the invention, which has the same structure as the device of the second embodiment shown in FIG. 9, except that the buffering space 68 is realized by selectively removing the organic dielectric layer 42 and the underlying glass plate 40 on the TFT substrate 12.

Therefore, the explanation about the same structure is omitted here for the sake of simplification by attaching the same reference symbols as those used in the second embodiment to the same or corresponding elements.

Obviously, the device of the fourth embodiment has the same advantages as those of the second embodiment.

The space 68 may be formed by selectively removing the glass plate 34 of the opposite substrate 14.

Other Embodiments

It is needless to say that the invention is not limited to the above-described first to fourth embodiments. Any modification is applicable to these embodiments. For example, although the spacers 24 are fixed on the opposite substrate 14, they may be fixed on the TFT substrate 12. Moreover, the buffering space 68 formed in the non-display region 20 may be realized any other method than those used in the above-described embodiments.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A LCD device comprising:
   a first substrate on which pixels are arranged;
   a second substrate coupled to the first substrate with a sealing member in such a way as to form a gap between the first and second substrates;
   a liquid-crystal layer formed in the gap, the liquid crystal layer being confined by the sealing member; and
   spacers arranged in the liquid-crystal layer;
   wherein the first substrate has a display region for displaying images, the display region being defined to include the pixels;
   wherein the first substrate has a non-display region formed outside the display region, the non-display region being located between the display region and the sealing member;
   wherein the spacers are located in a first part of the liquid-crystal layer corresponding to the display region while none of the spacers are located in a second part of the liquid-crystal layer corresponding to the non-display region; and
   further comprising a depression formed on an inner surface of the first or second substrate;
   wherein the depression is located in the second part of the liquid-crystal layer, and the depression constitutes a buffer space which receives extra liquid crystal from the liquid crystal layer; and
   wherein the depression is substantially vacant except for the extra liquid crystal.

2. The device according to claim 1, wherein TFTs are arranged on the first substrate in such a way as to be electrically connected to the respective pixels, and a dielectric layer is formed on the first substrate to cover the TFTs and the pixels;
   and wherein the depression is formed in the dielectric layer.

3. The device according to claim 1, wherein a dielectric layer is formed on the second substrate;
   and wherein the depression is formed in the dielectric layer.

4. The device according to claim 1, wherein one of the first and second substrates comprises a transparent plate and the depression is formed on an inner surface of the plate.

5. The device according to claim 1, wherein when the non-display region has a width $L(\mu m)$ and the gap in the display region has an average value $d(\mu m)$, the depression has a height $H$ satisfying a relationship of $$H \geq (1/2) \times (1000+L) \times [0.02d + [L \times (0.02d/1000)]]/L(\mu m).$$

6. The device according to claim 1, wherein the spacers are pole-shaped and formed on one of the first and second substrates.

7. The device according to claim 1 wherein the depression forms a step between the display region and the non-display region.

8. The device according to claim 1, further comprising a dielectric overcoat layer on at least a portion of the second substrate;
   wherein at least a portion of the dielectric overcoat layer in the second part of the liquid-crystal layer is selectively etched to remove portions of the dielectric overcoat layer and form the depression.

9. The device according to claim 1, wherein the spacers comprise a plurality of discrete spacers.

10. The device according to claim 1, wherein the spacers comprise a plurality of discrete spacers arranged in a matrix with a plurality of rows and columns.

11. The device according to claim 10, wherein the spacers are pole-shaped.

* * * * *